Patented Apr. 11, 1933

1,903,587

UNITED STATES PATENT OFFICE

JÜRGEN CALLSEN, OF WUPPERTAL-ELBERFELD, GERMANY, ASSIGNOR TO WINTHROP CHEMICAL COMPANY, INC., OF NEW YORK, N. Y., A CORPORATION OF NEW YORK

PROCESS FOR THE MANUFACTURE OF HALOGEN ALCOHOLS

No Drawing. Application filed March 16, 1932, Serial No. 599,330, and in Germany March 21, 1931.

The present invention relates to a process of preparing aliphatic halogen alcohols.

It is known that the aliphatic halogen aldehydes take in an exceptional position, when compared with the aliphatic halogen-free aldehydes inasmuch as the halogen-free aldehydes can be reduced to the corresponding alcohols with magnesium- or halogen magnesium alcoholates in the solution of a primary or secondary alcohol whereas the halogen aldehydes, when treated in the same manner, cannot be transferred into the corresponding halogen alcohols. When treating, for example, trichloroacetaldehyde in such a manner, the trichloroacetaldehyde is decomposed to a small part into carbon oxide and chloroform, chiefly, however, into formic acid ester and chloroform.

In accordance with the present invention aliphatic halogen aldehydes containing no carbon double bonds can be reduced to the corresponding halogen alcohols in a convenient manner, when the aliphatic halogen aldehydes are treated with halogen magnesium alcoholates either without any solvent or diluent or in the presence of a solvent not containing hydroxyl groups and being inert to the starting materials, and when the condensation products primarily formed are decomposed by means of water which advantageously contains some mineral acid. When using solvents of the above specified kind in the reaction mixture the presence of an alcohol, for example, of ethyl alcohol, is not of disadvantage since the noxious action of the alcohol is annulled by the indifferent solvent.

The reaction probably performs, when reacting, for instance, upon tribromoacetaldehyde with bromomagnesium ethylate in accordance with the following equations:

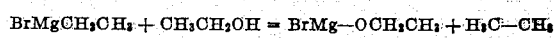

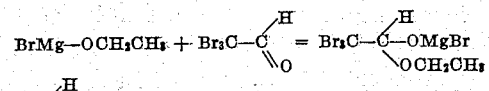

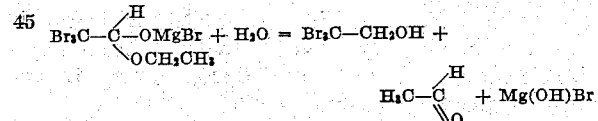

The halogen magnesium alcoholates are prepared by reacting upon a halogen magnesium alkyl compound with an alcohol. For instance, bromomagnesium ethylate is obtained in accordance with the following equation:

$$BrMgC_2H_5 + CH_3CH_2OH = BrMg-OCH_2CH_3 + H_3C-CH_3$$

The reaction is advantageously performed by reacting upon a halogen magnesium alkyl compound with an alcohol preferably in an ethereal solution and mixing the solution of the halogen magnesium alcoholates thus obtained, with the aliphatic halogen aldehyde to be reduced. After stirring for some hours, the reaction mixture is decomposed by the addition of ice water and acidified by means of a dilute mineral acid such as hydrochloric acid or sulfuric acid. Then the ethereal layer is separated, washed neutral, dried and the ether is distilled off. The remaining halogen alcohol may be purified by recrystallizing or by fractionating, preferably, under reduced pressure. Instead of ether other solvents not containing hydroxyl groups and being inert to the starting materials such as benzene, ligroin and anisol may be employed.

Halogen magnesium alcoholates of very different alcohols may be used as reacting agents, for example, the halogen magnesium alcoholates of ethyl-, propyl-, isopropyl-, butyl-, isoamyl- and benxyl alcohol.

In the described manner halogenated acetaldehydes, for instance, tribromoacetaldehydes, trichloroacetaldehyde, dichloroacetaldehyde, mono-chloroacetaldehyde, further, halogenated propionic- and butyric aldehydes can be reduced to the corresponding halogen alcohols. The reaction is preferably performed at room temperature, sometimes heating is of an advantage in order to complete the reacting process.

The following examples serve to illustrate this invention but without limiting it thereto. The parts are by weight.

*Example 1.*—225 parts of bromo-magnesium ethylalcoholate, prepared by reacting upon 200 parts of ethyl magnesium bromide upon 69 parts of ethyl alcohol, are mixed in ethereal solution with 281 parts of tribromoacetaldehyde, while stirring. After some hours the reaction mixture is mixed with ice water and acidified by means of dilute hydrochloric acid. The ethereal layer is separated, washed neutral, dried and then the ether is distilled off. The residue is purified by fractionating in vacuo or by recrystallizing from ligroin. The tribromoethylalcohol is thus obtained in the form of white needles of the melting point 79 to 80° C., boiling under a pressure of 10 mm. at 92 to 93° C.

*Example 2.*—246 parts of bromomagnesium-isopropylate, prepared by reacting upon 200 parts of ethylmagnesiumbromide with 90 parts of isopropylalcohol, are mixed in ethereal solution with 147 parts of trichloroacetaldehyde, while stirring and heating on the water bath. After some hours ice water and dilute hydrochloric acid is added and the mixture is worked up as indicated in Example 1. The trichloroethylalcohol is obtained by fractionating in vacuo as a colorless liquid boiling under a pressure of 11 mm. at 55 to 56° C.

*Example 3.*—163 parts of bromomagnesium-isopropylate, prepared by reacting upon 133 parts of ethylmagnesiumbromide with 60 parts of isopropylalcohol, are mixed in ethereal solution with 281 parts of tribromoacetaldehyde, while stirring and gently heating. When working up the reaction mixture as above indicated, the tribromoethylalcohol is obtained displaying properties as described in Example 1.

*Example 4.*—A solution of 214 parts of hydrobenzoine in benzene are introduced into an ethereal solution of 270 parts of ethylmagnesiumbromide. Thereto a solution of 281 parts of tribromoacetaldehyde in ether is added, while stirring. In order to complete the reaction the mixture is boiled under reflux for a short time or is left standing during some days at room temperature. The reaction mixture is then treated with ice water and dilute hydrochloric acid, the ethereal solution separated is washed neutral and after drying with sodium sulfate the ether is removed. The remainder yields the tribromoethylalcohol by fractionating in vacuo or by steam distillation. The crystals obtained are recrystallized from ligroin and then display the properties indicated in Example 1.

*Example 5.*—From 246 parts of bromomagnesium-isopropylate, prepared as indicated in Example 2, the solvent is completely removed in vacuo. Then 281 parts of tribromoacetaldehyde are added. Thereby the reaction proceeds under self-heating. After 24 hours the mixture is treated with ice water and dilute hydrochloric acid and the tribromoethylalcohol formed is separated by steam distillation or by extraction with ligroin.

*Example 6.*—265 parts of bromomagnesium-n-butylate, prepared by reacting upon 220 parts of propylmagnesiumbromide with 111 parts of butylalcohol, are mixed in benzene solution with 175 parts of alphadichloro-beta-chloro-butyric aldehyde, while stirring. After about 6 hours ice water and hydrochloric acid are added to the reaction mixture. Then the benzene layer is separated, washed neutral and the benzene distilled off. From the residue the alpha-dichloro-beta-chlorobutylalcohol is obtained by steam distillation. After recrystallizing from petroleum-ether it has the melting point 61° C.

Instead of benzene ether or anisol may be used as solvents.

*Example 7.*—163 parts of bromomagnesium-isopropylate are mixed in ethereal solution with 202 parts of dibromoacetaldehyde, while stirring and gently heating. After some hours the mixture is treated with ice water in dilute hydrochloric acid. Then the ethereal layer is separated, washed neutral, dried and the ether distilled off. When fractionating the residue in vacuo, the dibromoethylalcohol boils under a pressure of 10 mm. at 70 to 72° C.

When using instead of 202 parts of dibromoacetaldehyde 78.5 parts of chloroacetaldehyde in the above example, chloroethylalcohol of the boiling point 128° C. is obtained.

While I have described my invention in great detail and with respect to preferred embodiments thereof, I do not desire to limit myself to such details or embodiments, since many modifications and changes may be made and the invention embodied in widely different forms without departing from the spirit or scope of the invention in its broadest aspects. Hence I desire to cover all modifications and forms within the scope or language of any one or more of the appended claims.

I claim:

1. The process which comprises reacting upon an aliphatic halogen aldehyde with a halogen magnesium alcoholate and decomposing the condensation product formed by means of water.

2. The process which comprises reacting upon a halogen acetaldehyde with a halogen magnesium alcoholate and decomposing the condensation product formed by means of water.

3. The process which comprises reacting upon a trihalogen acetaldehyde with a halogen magnesium alcoholate and decomposing the condensation product formed by means of water.

4. The process which comprises reacting upon tribromoacetaldehyde with a halogen magnesium alcoholate and decomposing the condensation product formed by means of water.

5. The process which comprises reacting upon trichloroacetaldehyde with a halogen magnesium alcoholate and decomposing the condensation product formed by means of water.

6. The process which comprises reacting upon an aliphatic halogen aldehyde with a halogen magnesium alcoholate in the presence of an organic solvent being inert to the starting materials and containing no hydroxyl group and decomposing the condensation product formed by means of water.

7. The process which comprises reacting upon a halogen acetaldehyde with a halogen magnesium alcoholate in the presence of an organic solvent being inert to the starting materials and containing no hydroxyl group, and decomposing the condensation product formed by means of water.

8. The process which comprises reacting upon a trihalogen acetaldehyde with a halogen magnesium alcoholate in the presence of an organic solvent being inert to the starting materials and containing no hydroxyl group, and decomposing the condensation product formed by means of water.

9. The process which comprises reacting upon tribromoacetaldehyde with a halogen magnesium alcoholate in the presence of an organic solvent being inert to the starting materials and containing no hydroxyl group, and decomposing the condensation product formed by means of water.

10. The process which comprises reacting upon trichloroacetaldehyde with a halogen magnesium alcoholate in the presence of an organic solvent being inert to the starting materials and containing no hydroxyl group, and decomposing the condensation product formed by means of water.

11. The process which comprises reacting upon an aliphatic halogen aldehyde with a halogen magnesium isopropylate in the presence of an organic solvent being inert to the starting materials and containing no hydroxyl group, and decomposing the condensation product formed by means of water.

12. The process which comprises reacting upon a halogen acetaldehyde with a halogen magnesium isopropylate in the presence of an organic solvent being inert to the starting materials and containing no hydroxyl group, and decomposing the condensation product formed by means of water.

13. The process which comprises reacting upon a trihalogen acetaldehyde with a halogen magnesium isopropylate in the presence of an organic solvent being inert to the starting materials and containing no hydroxyl group, and decomposing the condensation product formed by means of water.

14. The process which comprises reacting upon tribromoacetaldehyde with a halogen magnesium isopropylate in the presence of an organic solvent being inert to the starting materials and containing no hydroxyl group, and decomposing the condensation product formed by means of water.

15. The process which comprises reacting upon trichloroacetaldehyde with a halogen magnesium isopropylate in the presence of an organic solvent being inert to the starting materials and containing no hydroxyl group, and decomposing the condensation product formed by means of water.

16. The process which comprises reacting upon an aliphatic halogen aldehyde with a halogen magnesium alcoholate in the presence of ether and decomposing the condensation product formed by means of water.

17. The process which comprises reacting upon a trihalogenacetaldehyde with a halogen magnesium alcoholate in the presence of ether and decomposing the condensation product formed by means of water.

18. The process which comprises reacting upon tribromoacetaldehyde with a halogen magnesium alcoholate in the presence of ether and decomposing the condensation product formed by means of water.

19. The process which comprises reacting upon trichloroacetaldehyde with a halogen magnesium alcoholate in the presence of ether and decomposing the condensation product formed by means of water.

20. The process which comprises reacting upon tribromoacetaldehyde with bromo magnesium isopropylate in the presence of ether and decomposing the condensation product formed by means of water.

21. The process which comprises reacting upon trichloroacetaldehyde with bromo magnesium isopropylate in the presence of ether and decomposing the condensation product formed by means of water.

In testimony whereof, I affix my signature.

JÜRGEN CALLSEN.